US011933063B2

(12) United States Patent
Lingbloom

(10) Patent No.: US 11,933,063 B2
(45) Date of Patent: Mar. 19, 2024

(54) CAMPING TENT HEATING ASSEMBLY

(71) Applicant: Laura Lingbloom, Lindale, TX (US)

(72) Inventor: Laura Lingbloom, Lindale, TX (US)

( * ) Notice: Subject to any disclaimer, the term of this patent is extended or adjusted under 35 U.S.C. 154(b) by 209 days.

(21) Appl. No.: 17/516,992

(22) Filed: Nov. 2, 2021

(65) Prior Publication Data

US 2023/0138869 A1 May 4, 2023

(51) Int. Cl.
*E04H 15/12* (2006.01)
*E04H 15/56* (2006.01)
*H05B 3/34* (2006.01)

(52) U.S. Cl.
CPC ............. *E04H 15/12* (2013.01); *E04H 15/56* (2013.01); *H05B 3/34* (2013.01)

(58) Field of Classification Search
CPC ................................ E04H 15/56; E04H 15/12
See application file for complete search history.

(56) References Cited

U.S. PATENT DOCUMENTS 2,907,056 A * 10/1959 Kaplan ................... E04H 15/30 5/413 R
5,033,497 A * 7/1991 Hernandez .............. E04H 15/30 441/74
5,699,820 A * 12/1997 Evans ..................... E04H 15/32 5/413 R
6,302,094 B1 * 10/2001 Wehrly .................. A47C 7/748 135/92
D478,451 S 8/2003 Bergen
8,776,812 B1 * 7/2014 Forget ..................... E04H 15/56 135/96
9,624,688 B1 * 4/2017 Tyson ........................ B60P 3/39
9,808,087 B1 11/2017 Ghazal
10,136,734 B2 11/2018 Dewitt
10,533,291 B2 1/2020 Perkins
10,801,231 B1 * 10/2020 Ensign .................... E04H 15/12
2006/0210766 A1 9/2006 Press
2010/0126978 A1 5/2010 Semmes
2013/0074894 A1 * 3/2013 Cook .................... E04H 15/001 135/96
2017/0335523 A1 11/2017 Moussa
2019/0010725 A1 * 1/2019 Bueno ..................... E04H 15/54
2020/0190757 A1 6/2020 Gilot

FOREIGN PATENT DOCUMENTS

WO WO 2015075029 5/2015

* cited by examiner

*Primary Examiner* — Noah Chandler Hawk

(57) ABSTRACT

A camping tent heating assembly for keeping campers warm in a camping tent includes a camping tent that has a floor. A heating pad is positionable beneath the floor of the camping tent such that the heating pad is in thermal communication with the floor. The heating pad heats the floor when the heating pad is turned on to warm campers that are sleeping in the camping tent. A connection box is coupled to the heating pad and the connection box is in electrical communication with the heating pad. A control unit is in electrical communication with the connection box for turning the heating pad on and off. The control unit has a heat adjustment control to adjust a temperature of the heating pad between a minimum temperature and a maximum temperature.

6 Claims, 6 Drawing Sheets

CAMPING TENT HEATING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

The Names of the Parties to a Joint Research Agreement

Not Applicable

Incorporation-by-Reference of Material Submitted on a Compact Disc or as a Text File Via the Office Electronic Filing System Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to heating devices and more particularly pertains to a new heating device for keeping campers warm in a camping tent. The device includes a camping tent and a heating pad that is positionable under the camping tent. The heating pad heats a floor of the camping tent to warm campers that are sleeping in the camping tent. The device includes a control box that is remotely positioned with respect to the camping tent.

(2) Description of Related Art Including Information Disclosed Under 37 CFR 1.97 and 1.98

The prior art relates to heating devices including a sunbathing mat that includes a thermal pocket for storing a beverage. The prior art discloses an electric blanket that can be worn on a user. The prior art discloses a variety of snow melting pads that are each positionable on a walkway for melting snow on the walkway. The prior art discloses a heating pad which has a remotely positioned control box. In no instance does the prior art disclose a camping tent and a heating pad that is positionable under the camping tent.

BRIEF SUMMARY OF THE INVENTION

An embodiment of the disclosure meets the needs presented above by generally comprising a camping tent that has a floor. A heating pad is positionable beneath the floor of the camping tent such that the heating pad is in thermal communication with the floor. The heating pad heats the floor when the heating pad is turned on to warm campers that are sleeping in the camping tent. A connection box is coupled to the heating pad and the connection box is in electrical communication with the heating pad. A control unit is in electrical communication with the connection box for turning the heating pad on and off. The control unit has a heat adjustment control to adjust a temperature of the heating pad between a minimum temperature and a maximum temperature.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
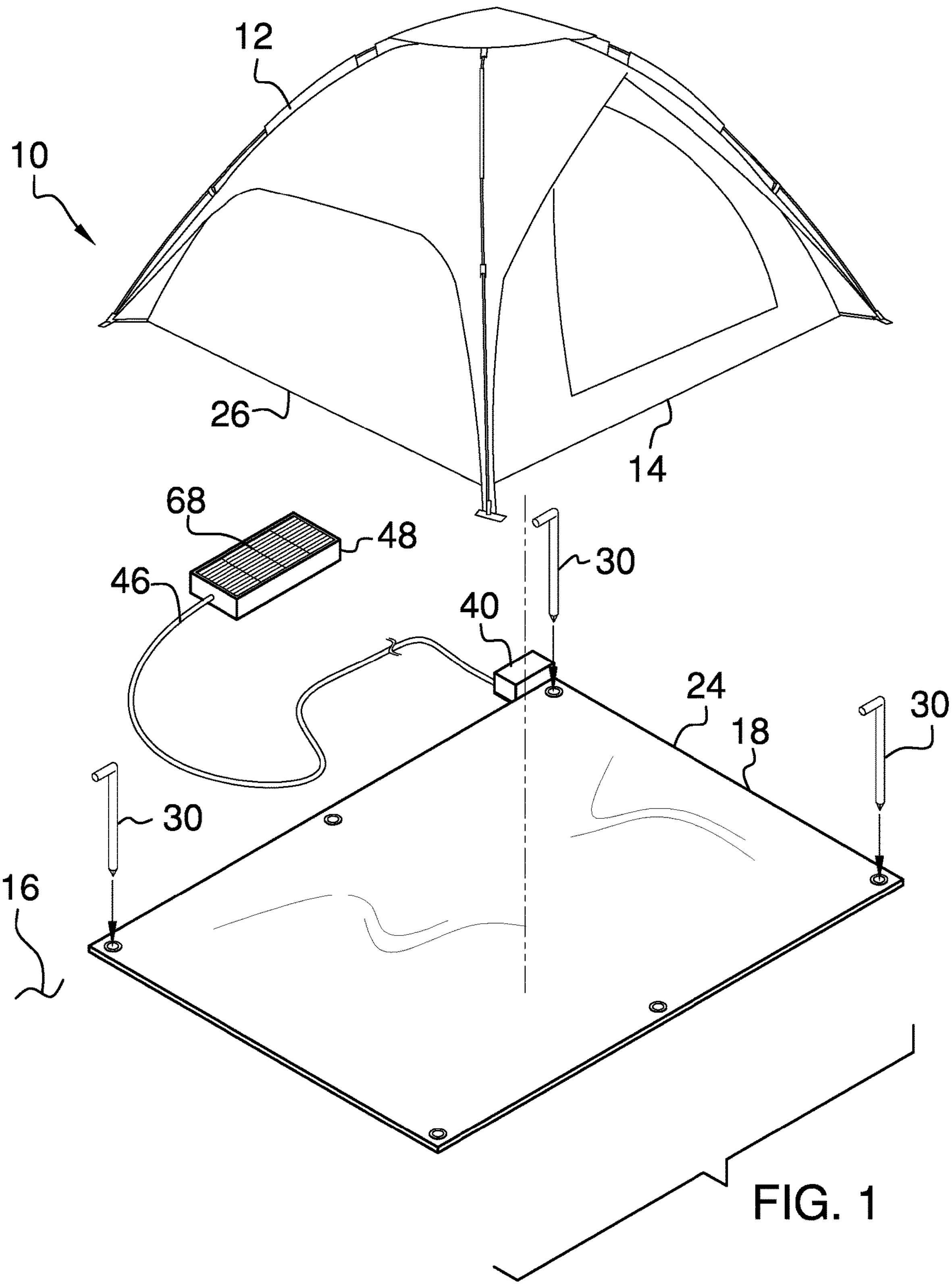
FIG. 1 is an exploded perspective view of a camping tent heating assembly according to an embodiment of the disclosure.
Figure 2:
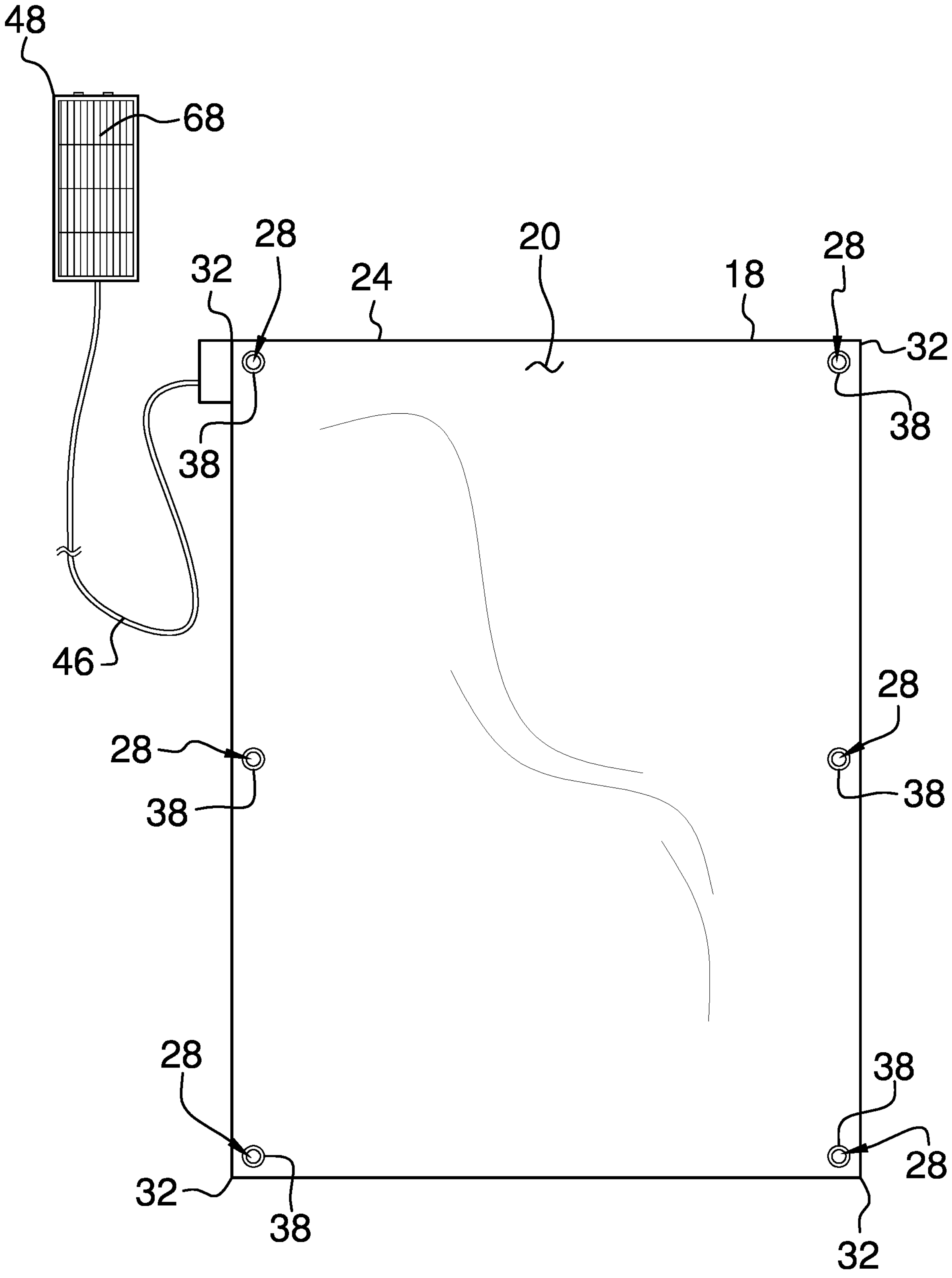
FIG. 2 is a top view of a heating pad of an embodiment of the disclosure.
Figure 3:
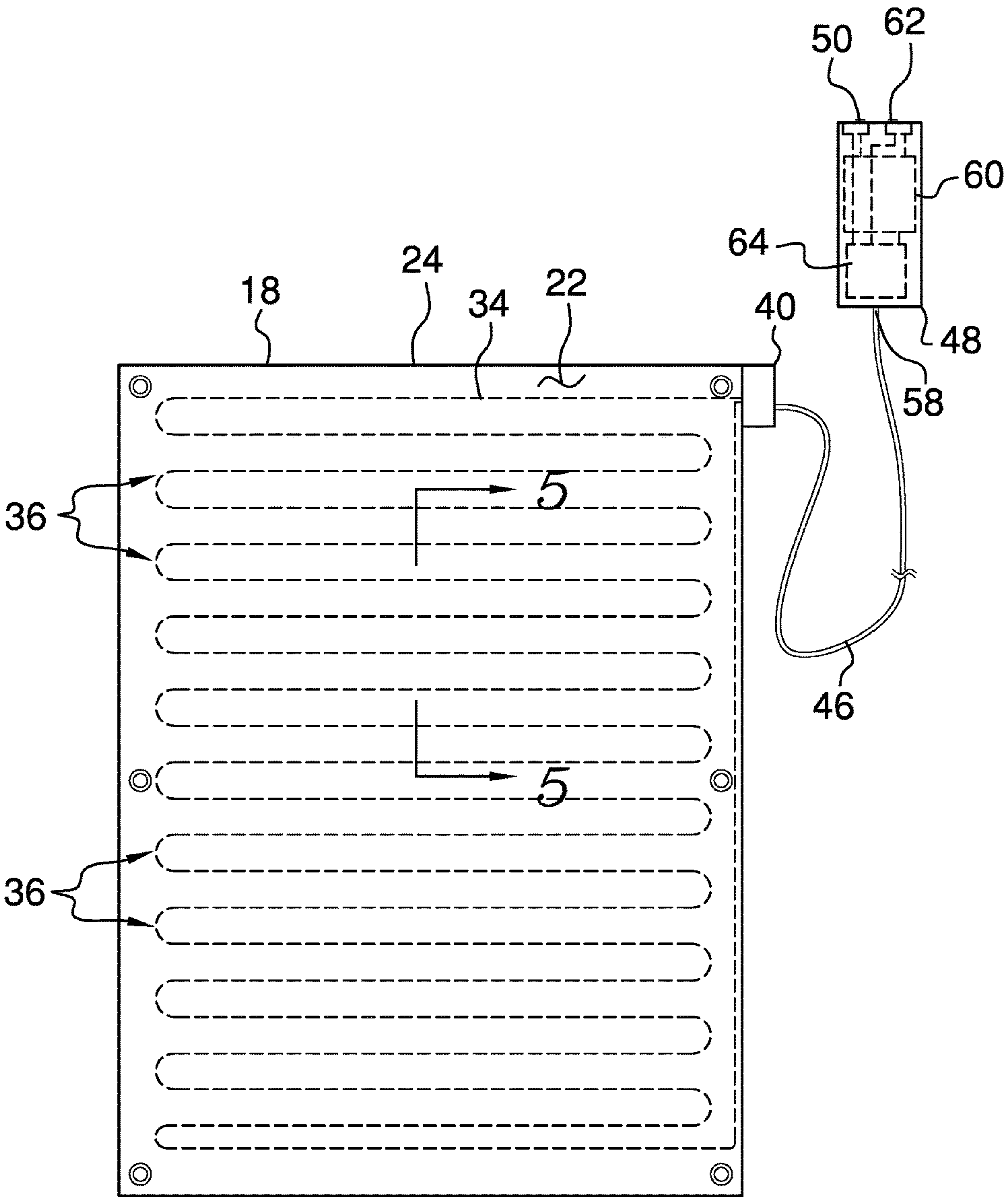
FIG. 3 is a bottom phantom view of a heating pad of an embodiment of the disclosure.
Figure 4:
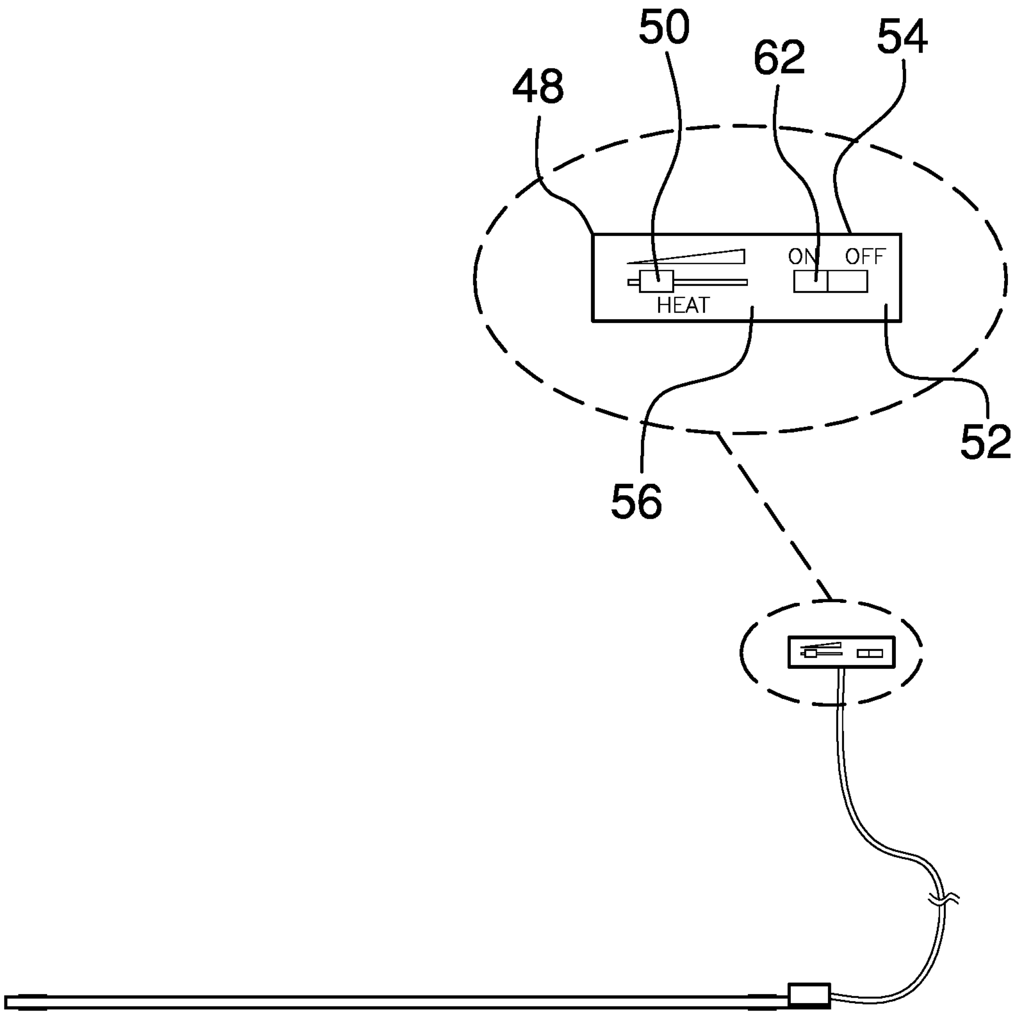
FIG. 4 is a front view of a heating pad of an embodiment of the disclosure.
Figure 5:
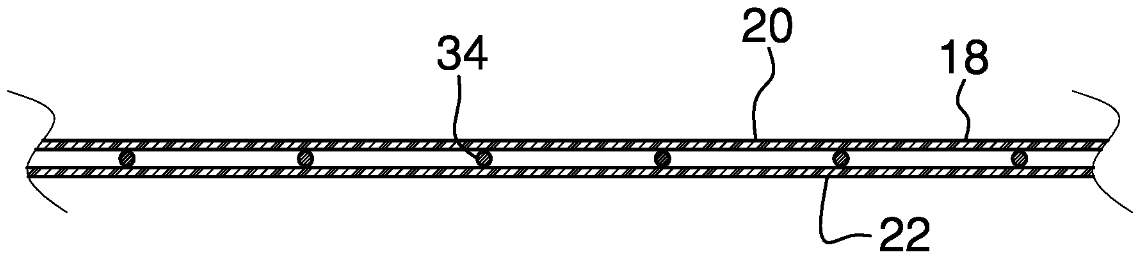
FIG. 5 is a cross sectional view taken along line 5-5 of FIG. 3 of an embodiment of the disclosure.
Figure 6:
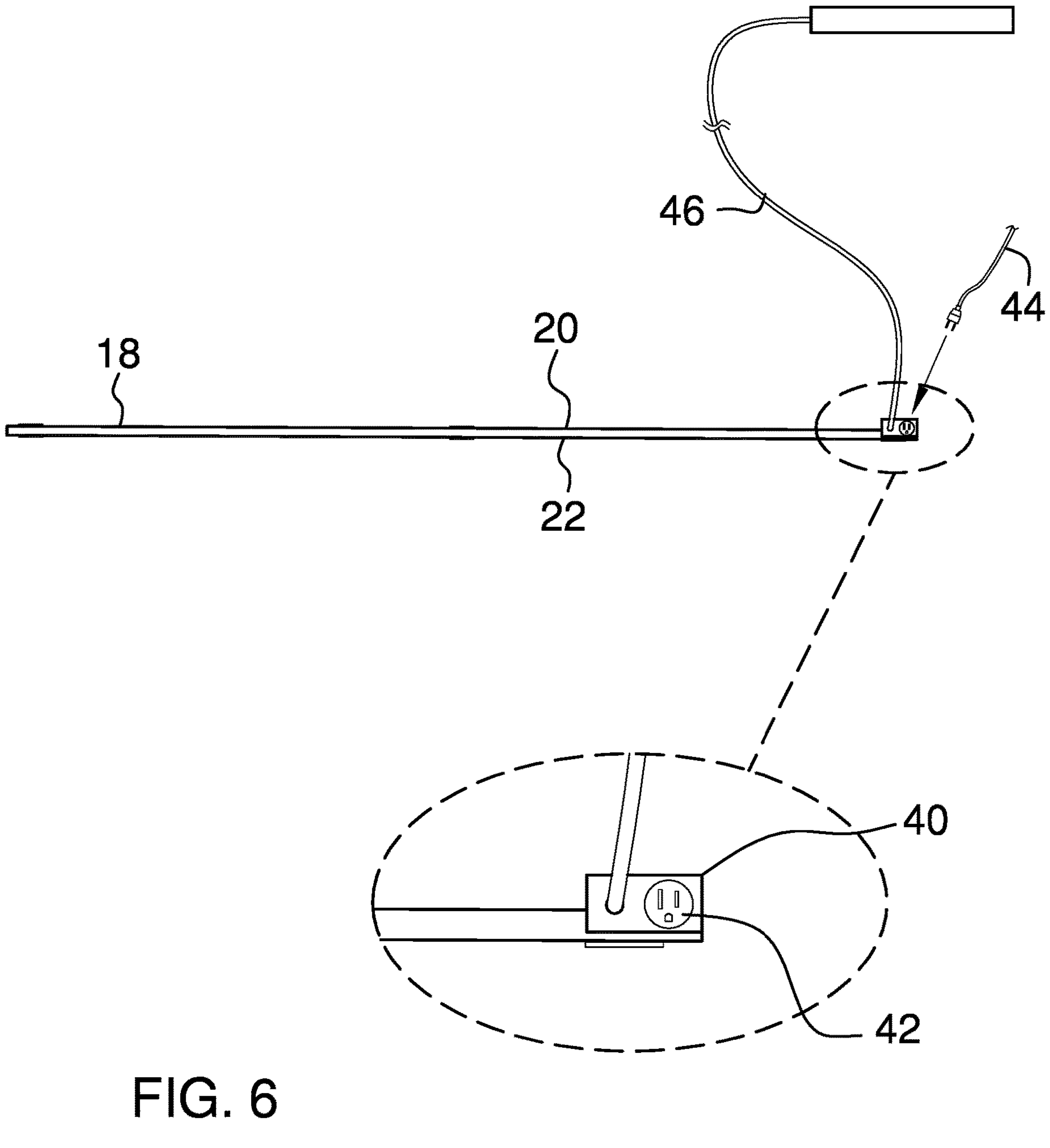
FIG. 6 is a back view of heating pad of an embodiment of the disclosure.

With reference now to the drawings, and in particular to FIGS. 1 through 6 thereof, a new heating device embodying the principles and concepts of an embodiment of the disclosure and generally designated by the reference numeral 10 will be described.

As best illustrated in FIGS. 1 through 6. the camping tent heating assembly 10 generally comprises a camping tent 12 that has a floor 14 which can be positioned on a support surface 16. The support surface 16 may be the ground or other horizontal support surface. Additionally, the camping tent 12 may be a single person camping tent 12, a multiple person camping tent 12 or any other conventional type of camping tent 12 which has a floor. A heating pad 18 is provided which is positionable beneath the floor 14 of the camping tent 12 such that the heating pad 18 is in thermal communication with the floor 14. The heating pad 18 heats the floor 14 when the heating pad 18 is turned on to warm campers that are sleeping in the camping tent 12.

The heating pad 18 has a top surface 20, a bottom surface 22 and a perimeter edge 24 extending between the top surface 20 and the bottom surface 22. The top surface 20 comprise a thermally conductive material and the top surface 20 abuts a lower surface 26 of the floor 14 when the camping tent 12 is positioned on the heating pad 18 thereby facilitating the floor 14 to be in thermal communication with the top surface 20. The heating pad 18 has a plurality of holes 28 each extending through the top surface 20 and the bottom surface 22 and each of the holes 28 receives a respective stake 30 for securing the heating pad 18 to the support surface 16. Each of the holes 28 is aligned with a respective one of four corners 32 of the heating pad 18.

The heating pad 18 includes a heating element 34 that is positioned between the top surface 20 and the bottom surface 22 of the heating pad 18. The heating element 34 is formed into a plurality of loops 36 that are distributed over an entire length and width of the heating pad 18. Additionally, the heating element 34 may comprise an electronic heating element which has an operational temperature ranging between approximately 100.0 degrees Fahrenheit and 150.0 degrees Fahrenheit. A plurality of grommets 38 is provided and each of the grommets 38 is integrated into the heating pad 18. Each of the grommets 38 surrounds a respective one of the holes 28 in the heating pad 18. Each of the grommets 38 is comprise of a resilient material to inhibit the respective hole 28 from being damaged by the stake 30.

A connection box 40 is coupled to the heating pad 18 and the connection box 40 is in electrical communication with the heating pad 18. The connection box 40 is coupled to the perimeter edge 24 of the heating pad 18 and the connection box 40 is electrically coupled to the heating element 34. A female electrical outlet 42 is integrated into the connection box 40 and the female electrical outlet 42 can be electrically coupled to a power source 44 comprising an electrical generator or other extrinsic source of electrical energy. The connection box 40 has a conductor 46 which is coupled to and extends away from the connection box 40.

A control unit 48 is in electrical communication with the connection box 40 for turning the heating pad 18 on and off. The control unit 48 has a heat adjustment control 50 that is movably integrated into the control unit 48. The heat adjustment control 50 adjusts a temperature of the heating pad 18 between a minimum temperature and a maximum temperature. The control unit 48 comprises a control housing 52 that has a top wall 54 and an outer wall 56. The outer wall 56 is coupled to a distal end 58 of the conductor 46 which extends away from the connection box 40. Additionally, the heat adjustment control 50 is slidably integrated into the outer wall 56 of the control housing 52.

The control unit 48 includes a control circuit 60 that is integrated into the control housing 52. The control circuit 60 is electrically coupled to the conductor 46 and the heat adjustment control 50 is electrically coupled to the control circuit 60. The control unit 48 includes a power button 62 that is movably integrated into the control housing 52. The power button 62 is electrically coupled to the control circuit 60 for turning the heating element 34 on and off.

A power supply 64 is integrated into the control housing 52 and the power supply 64 is electrically coupled to the control circuit 60. The power supply 64 comprises at least one rechargeable battery 66 that is integrated into the control housing 52 and the at least one rechargeable battery 66 is electrically coupled to the control circuit 60. The power supply 64 includes a solar panel 68 that is coupled to the top wall 54 of the control housing 52 such that the solar panel 68 is exposed to sunlight. Additionally, the solar panel 68 is electrically coupled to the at least one rechargeable battery 66 for charging the at least one rechargeable battery 66.

In use, the heating pad 18 is positioned on the support surface 16 and the camping tent 12 is positioned on the heating pad 18. The power button 62 is manipulated to turn on the heating element 34 and the heat adjustment is manipulated to adjust the temperature of the heating element 34. In this way campers that are sleeping in the camping tent 12 can be kept warm while sleeping in the camping tent 12. A generator or other extrinsic power source can be plugged into the female electrical outlet 42 in the control box. In this way the heating element 34 can be powered in the event that the at least one rechargeable battery 66 is depleted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A camping tent heating assembly for heating a floor of a camping tent thereby facilitating campers to stay warm, said assembly comprising:

a camping tent having a floor wherein said floor is configured to be positioned on a support surface;

a heating pad being positionable beneath said floor of said camping tent such that said heating pad is in thermal communication with said floor, said heating pad heating said floor when said heating pad is turned on wherein said heating pad is configured to heat campers that are sleeping in said camping tent;

a connection box being coupled to said heating pad, said connection box being in electrical communication with said heating pad;

a control unit being in electrical communication with said connection box for turning said heating pad on and off, said control unit having a heat adjustment control being movably integrated into said control unit, said heat adjustment control adjusting a temperature of said heating pad between a minimum temperature and a maximum temperature;

wherein said connection box has a conductor being coupled to and extending away from said connection box; and wherein said control unit comprises a control housing having a top wall and an outer wall, said outer wall being coupled to a distal end of said conductor which extends away from said connection box, said heat adjustment control being slidably integrated into said outer wall of said control housing.

2. The assembly according to claim 1, wherein said heating pad has a top surface, a bottom surface and a perimeter edge extending between said top surface and said bottom surface, said top surface comprising a thermally conductive material, said top surface abutting a lower surface of said floor when said camping tent is positioned on said heating pad thereby facilitating said floor to be in thermal communication with said top surface, said heating pad having a plurality of holes each extending through said top surface and said bottom surface wherein each of said holes is configured to receive a respective stake for securing said heating pad to the support surface, each of said holes being aligned with a respective one of four corners of said heating pad.

3. The assembly according to claim 2, wherein said heating pad includes a heating element being positioned between said top surface and said bottom surface of said heating pad, said heating element being formed into a plurality of loops being distributed over an entire length and width of said heating pad.

4. The assembly according to claim 1, wherein said control unit includes:

a control circuit being integrated into said control housing, said control circuit being electrically coupled to said conductor, said heat adjustment control being electrically coupled to said control circuit;

a power button being movably integrated into said control housing, said power button being electrically coupled to said control circuit for turning said heating element on and off; and a power supply being integrated into said control housing, said power supply being electrically coupled to said control circuit, said power supply comprising:

at least one rechargeable battery being integrated into said control housing, said at least one rechargeable battery being electrically coupled to said control circuit; and a solar panel being coupled to said top wall of said control housing wherein said solar panel is configured to be exposed to sunlight, said solar panel being electrically coupled to said at least one rechargeable battery for charging said at least one rechargeable battery.

5. A camping tent heating assembly for heating a floor of a camping tent, thereby facilitating campers to stay warm, said assembly comprising:

a camping tent having a floor wherein said floor is configured to be positioned on a support surface;

a heating pad being positionable beneath said floor of said camping tent such that said heating pad is in thermal communication with said floor, said heating pad heating said floor when said heating pad is turned on wherein said heating pad is configured to heat campers that are sleeping in said camping tent;

a connection box being coupled to said heating pad, said connection box being in electrical communication with said heating pad;

a control unit being in electrical communication with said connection box for turning said heating pad on and off, said control unit having a heat adjustment control being movably integrated into said control unit, said heat adjustment control adjusting a temperature of said heating pad between a minimum temperature and a maximum temperature;

wherein said heating pad has a top surface, a bottom surface and a perimeter edge extending between said top surface and said bottom surface, said top surface comprising a thermally conductive material, said top surface abutting a lower surface of said floor when said camping tent is positioned on said heating pad thereby facilitating said floor to be in thermal communication with said top surface, said heating pad having a plurality of holes each extending through said top surface and said bottom surface wherein each of said holes is configured to receive a respective stake for securing said heating pad to the support surface, each of said holes being aligned with a respective one of four corners of said heating pad;

wherein said heating pad includes a heating element being positioned between said top surface and said bottom surface of said heating pad, said heating element being formed into a plurality of loops being distributed over an entire length and width of said heating pad; and wherein said connection box is coupled to said perimeter edge of said heating pad, said connection box being electrically coupled to said heating element, said connection box having a female electrical outlet being integrated into said connection box wherein said female electrical outlet, is configured to be electrically coupled to a power source comprising an electrical generator, said connection box having a conductor being coupled to and extending away from said connection box.

6. A camping tent heating assembly for heating a floor of a camping tent thereby facilitating campers to stay warm, said assembly comprising:

a camping tent having a floor wherein said floor is configured to be positioned on a support surface;

a heating pad being positionable beneath said floor of said camping tent such that said heating pad is in thermal communication with said floor, said heating pad heating said floor when said heating pad is turned on wherein said heating pad is configured to heat campers that are sleeping in said camping tent, said heating pad having a top surface, a bottom surface and a perimeter edge extending between said top surface and said bottom surface, said top surface comprising a thermally conductive material, said top surface abutting a lower surface of said floor when said camping tent is positioned on said heating pad thereby facilitating said floor to be in thermal communication with said top surface, said heating pad having a plurality of holes each extending through said top surface and said bottom surface wherein each of said holes is configured to receive a respective stake for securing said heating pad to the support surface, each of said holes being aligned with a respective one of four corners of said heating pad, said heating pad including a heating element being positioned between said top surface and said bottom surface of said heating pad, said heating element being formed into a plurality of loops being distributed over an entire length and width of said heating pad;

a plurality of grommets, each of said grommets being integrated into said heating pad, each of said grommets surrounding a respective one of said holes in said heating pad, each of said grommets being comprise of a resilient material wherein each of said grommets is configured to inhibit said respective hole from being damaged by the stake;

a connection box being coupled to said heating pad, said connection box being in electrical communication with said heating pad, said connection box being coupled to said perimeter edge of said heating pad, said connection box being electrically coupled to said heating element, said connection box having a female electrical outlet being integrated into said connection box wherein said female electrical outlet is configured to be electrically coupled to a power source comprising an electrical generator, said connection box having a conductor being coupled to and extending away from said connection box; and a control unit being in electrical communication with said connection box for turning said heating pad on and off, said control unit having a heat adjustment control being movably integrated into said control unit, said heat adjustment control adjusting a temperature of said heating pad between a minimum temperature and a maximum temperature, said control unit comprising:

a control housing having a top wall and an outer wall, said outer wall being coupled to a distal end of said conductor which extends away from said connection box, said heat adjustment control being slidably integrated into said outer wall of said control housing;

a control circuit being integrated into said control housing, said control circuit being electrically coupled to said conductor, said heat adjustment control being electrically coupled to said control circuit;

a power button being movably integrated into said control housing, said power button being electrically coupled to said control circuit for turning said heating element on and off; and a power supply being integrated into said control housing, said power supply being electrically coupled to said control circuit, said power supply comprising:

at least one rechargeable battery being integrated into said control housing, said at least one rechargeable battery being electrically coupled to said control circuit; and a so panel being coupled to said top wall of said control housing wherein said solar panel is configured to be exposed to sunlight, said solar panel being electrically coupled to said at least one rechargeable battery for charging said at least one rechargeable battery.

* * * * *